United States Patent [19]
Ohno

[11] Patent Number: 5,745,303
[45] Date of Patent: Apr. 28, 1998

[54] ZOOM LENS SYSTEM

[75] Inventor: Kazunori Ohno, Omiya, Japan

[73] Assignee: Fuji Photo Optical Co., Ltd., Saitama-ken, Japan

[21] Appl. No.: 487,245

[22] Filed: Jun. 13, 1995

[51] Int. Cl.$^6$ .............................. G02B 15/14; G02B 3/02
[52] U.S. Cl. ............................................. 359/691; 359/717
[58] Field of Search ..................................... 359/691, 689, 359/714–717

[56] References Cited

U.S. PATENT DOCUMENTS

| | | | |
|---|---|---|---|
| 5,283,693 | 2/1994 | Kohno et al. | 359/691 |
| 5,381,269 | 1/1995 | Estelle | 359/691 |
| 5,473,473 | 12/1995 | Estelle et al. | 359/691 |

*Primary Examiner*—Georgia Y. Epps
*Assistant Examiner*—Jordan M. Schwartz
*Attorney, Agent, or Firm*—Young & Thompson

[57] ABSTRACT

A zoom lens system comprises a stationary negative power singlet and a positive power singlet which is movable between two specific axial positions so as to change its focal length between the shortest focal length suitable for wide angle photography and the longest focal length suitable for a tele-photography, and satisfies the following condition:

$$f_W \cdot \beta^{1/2}/(1+\beta^{1/2}) < f_2 \leq (2 \cdot F_{NO} \cdot LD/1500) \cdot \beta^{1/2}/(1-\beta^{1/2})^2$$

where $f_w$ is the overall focal length of the zoom lens system at the wide angle end, $\beta$ is the zoom ratio of the zoom lens system which is expressed by a ratio of the overall focal length between the tele-photo end and the wide angle end, $f_2$ is the focal length of the second lens group, $F_{NO}$ is the F number of the zoom lens system at the wide angle end, and LD is the diagonal length of the image area.

9 Claims, 5 Drawing Sheets

ZOOM LENS SYSTEM

BACKGROUND OF THE INVENTION

1. Field of the invention

The present invention relates to a zoom lens system comprising two lens groups suitable for single use lens-fitted film units and compact still cameras. Such single use lens-fitted film units comprise a roll of unexposed film pre-loaded at the factory into a housing having a taking lens. When the film is totally exposed, the film unit is given to a photoprocessor who develops the film and returns the developed film and any desired prints to the customer, the housing being recycled. Such film units are disclosed for example in U.S. Pat. No. 5,343,265, among many others.

2. Description of Related Art

Much attention has been given to various approaches relating to reducing the number of movable lens groups of an optical compensation type of zoom lens systems as few as possible for the purpose of simplifying zooming mechanisms. Typically, because most zoom lens systems of this type comprise at least three lens groups including at least two movable lens groups, various constraints must be imparted upon the mechanical dimensions, in particular the overall length of the system, and other relationships of optical elements within the systems which are not always desirable. Consequently, the zoom lens system of this type is not suitable for compact cameras and single-use lens-fitted film units.

In Japanese Laid-Open Patent No. 5-164965 filed by the applicant of the present invention, a zoom lens system is provided which comprises two lens groups, one of which, namely a front lens group, has a negative power and another, namely a rear lens group, has a positive power. This zoom lens system is, however, no more than simple and compact in principle optical structure and not always suitable for compact cameras and single-use lens-fitted film units.

SUMMARY OF THE INVENTION

It is an object of the present invention to provide a zoom lens system which is simple and compact in optical structure for zooming so as to be suitable for compact cameras and single-use lens-fitted film units.

The aforesaid object of the present invention is achieved by providing a zoom lens system comprises first and second lens group, namely a negative power lens group and a positive power lens group arranged in order from the object end along the optical axis OX, and a diaphragm or lens stop behind the second lens group as viewed on the object side. The first lens group is stationary with respect to the zoom lens system. The second lens group is movable along the optical axis OX during zooming between a wide angle end (EDW) and a tele-photo (tele-photographic) end (EDT).

A zoom lens system embodying the present invention may be designed for various focal length ranges by satisfying the following condition:

$$f_w \cdot \beta^{1/2}(1+\beta^{1/2}) < f_2 \leq (2 \cdot F_{NO} \cdot LD/1500) \cdot \beta^{1/2}/(1-\beta^{1/2})^2 \qquad (I)$$

where $f_w$ is the overall focal length of the zoom lens system at the wide angle end (EDW);

$\beta$ is the zoom ratio of the zoom lens system which is expressed by a ratio of the overall focal length ($f_T/f_w$) at the tele-photo end (EDT) relative to at the wide angle end (EDW);

$f_2$ is the focal length of the second lens group;

$F_{NO}$ is the F number of the zoom lens system at the wide angle end (EDW); and LD is the diagonal length of the image area.

The zoom lens system of the present invention preferably comprises a negative meniscus lens element having a convex object side surface as the first lens group and a positive meniscus lens element having a convex object side surface as the second lens group which satisfies the following condition:

$$0.2 < d_W/f_W < 0.6 \qquad (II)$$

where $d_W$ is the axial distance between the image end surfaces of the first and second lens groups G1 and G2 at the wide angle end (EDW).

The zoom lens system may be more desirable to have a positive power meniscus lens element having aspherical surfaces on both object and image sides.

Figure 1:
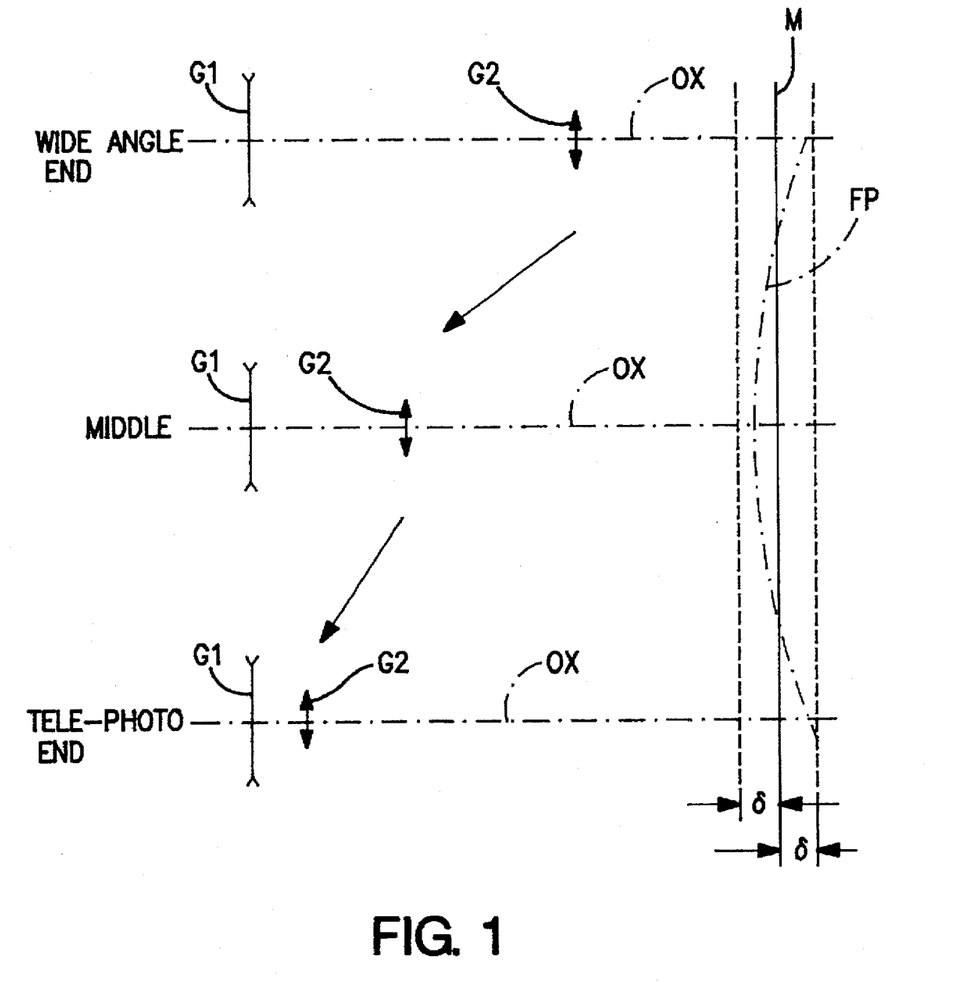
FIG. 1 is a schematic illustration showing a principle structure of a zoom lens system of the present invention.

Briefly stated, as shown in FIGS. 1, a zoom lens system of the present invention comprises a positive power first lens group G1 and a negative power second lens group G2 arranged in order from the object end along the optical axis OX. An image plane, in which a film is placed, is designated by M. The first lens group G1 is stationary with respect to the zoom lens system. The second lens group G2 is moved toward the first lens group G1 along the optical axis OX during changing the focal length between the shortest focal length for a wide angle photography end (EDW) and the longest focal length for a tele-photo (tele-photographic) end (EDT).

As the second lens group G2 moves toward the first lens group G1 along the optical axis OX, it changes both overall length and focal length so as to shift the focal point along a dotted line FP.

While the zoom lens system causes a shift in focal point during zooming, nevertheless, by providing for the zoom lens system a depth of focus ($2\delta$) sufficient to cover a shift in focal point between for the longest and shortest focal length, the zoom lens system has an optical performance when used with single use lens-fitted film units and compact still cameras.

The condition (I) yields the shift in focal point limited within the depth of focus ($2\delta$), allowed for single use lens-fitted film units and compact still cameras, when the zoom lens system changes its focal length between the wide angle end (EDW) and the tele-photo end (EDT). In particular, the first parameter $(f_W \cdot \beta^{1/2}/(1+\beta^{1/2}) < f_2)$ is necessary for suitably achieving the zooming feature.

Specifically describing the condition (I), letting the distance between principal points of the first and second lens groups G1 and G2 be dp, the overall focal length of the zoom lens system is expressed as follows:

$$1/f = 1/f_1 + 1/f_2 - dp/(f_1 \cdot f_2) \qquad (1)$$

where $f_1$ is the focal length of the first lens group; and
$f_2$ is the focal length of the second lens group.

Equation (1) is rewritten as follows:

$$dp = (1/f_1 + 1/f_2 - 1/f) \cdot f_1 \cdot f_2 \qquad (2)$$

Here, letting the back focal length of the zoom lens system for paraxial rays be 1 (one), the following equation is given:

$$1 = f(1 - dp/f_1) \qquad (3)$$

On referring to equations (2) and (3), the overall length of the zoom lens system L for paraxial rays is expressed as follows:

$$L = 1 + dp \quad (4)$$
$$= f_1 + 2f_2 - (f_1^2 + f^2) \cdot f_2/(f_1 \cdot f)$$

While equations (1)–(3) are given for thin lens systems, there is only an insignificant difference of a practical thick lens system from such a thin lens system, the following discussion will be made with equation (4).

When the zoom lens system takes the same overall length at both wide angle end and telephoto end (i.e. $L_W = L_T$), the focal length of the first lens group GI is expressed by transforming equation (4) as follows:

$$f_1 = -(f_W \cdot f_T)^{1/2} \quad (5)$$

Expressing equation (5) with use of the zoom ratio β, $$f_1 = -f_W \cdot \beta^{1/2} \quad (6)$$

A condition that the zoom lens system has a focal point within a depth of focus from the image plane M is obtained in the manner as described below.

When the zoom lens system is at an in-between position between the wide angle end and the tele-photo end, i.e. the focal length f of the zoom lens system is between the shortest and longest focal length ($f_W < f < f_T$), a difference ΔL in the overall length L of the zoom lens system at the in-between position from the largest overall length ($L_W$, $L_T$) at both wide angle end and tele-photo end is expressed as follows:

$$\Delta L = L - L_W \quad (7)$$
$$= (f_2/f_1) \cdot \{(1 + \beta) \cdot f_W - \beta \cdot f_W^2/f - f\}$$

In order to obtain a maximum of the difference ΔL, both sides of equation (7) are differentiated by f as follows:

$$d(\Delta L)/df = (f_2/f_1) \cdot (\beta \cdot f_W^2/f^2 - 1)$$

Since the difference ΔL takes a maximum value when the differential quotient is zero ($d(\Delta L)/df = 0$), the focal length f is expressed for the maximum difference as follows:

$$f = f_W \cdot \beta^{1/2} \quad (8)$$

Substituting equation (8) into equation (7), the maximum difference $\Delta_L M$ is expressed as follows:

$$\Delta L_M = -f_W (1 - \beta^{1/2})^2/\beta^{1/2} \quad (9)$$

The greatest shift of focal point from the image plane is defined as the absolute value of the maximum difference $\Delta L_M$.

On the other hand, letting the lens speed or F number of the zoom lens system and the allowable minimum diameter of a circle of confusion be $F_{NO}$ and ε, respectively, a depth of focus δ is defined as follows:

$$\delta = F_{NO} \cdot \epsilon$$

Since the allowable minimum diameter of a circle of confusion is ordinarily desirable to be 1/1500 as small as the diagonal length of exposure frame LD, the depth of focus δ is otherwise expressed as follows:

$$\delta = F_{NO} \cdot (LD/1500) \quad (10)$$

For example, when the zoom lens system is used with a 35 mm type of roll film, the diagonal length of exposure frame LD is approximately 43.3 mm.

The F number $F_{NO}$ varies between the wide angle end and the tele-photo end and takes the smallest value at the wide angle end. Consequently, in regard to determining the depth of focus δ, the smallest F number $F_{NO}$ and the greatest shift of focal point, for which the maximum difference of overall length $|\Delta L_M|$ is substituted, are preferred. In the following discussion, the F number $F_{NO}$ at the wide angle end is used.

In order for the greatest shift of focal point $|\Delta L_M|$ to be within two times as large as the depth of focus δ, the following condition must be satisfied:

$$|\Delta L_M| \leq 2\delta = 2F_{NO} \cdot LD/1500$$

Substituting equation (9) into this condition, the following condition is given:

$$f_2 \leq 2F_{NO} \cdot (LD/1500) \cdot \beta^{1/2}/(1-\beta^{1/2})^2 \quad (11)$$

Together, the zoom lens system must satisfy a condition that a distance dp between the principal points of the first and second lens groups G1 and G2 is positive at the wide angle end. Letting the distance between the principal points at the wide angle end be dp (W), equation (2) is expressed as follows:

$$dp(W) = (1/f_1 + 1/f_2 - 1/f) \cdot f_1 \cdot f_2 > 0$$

Here, because the focal length $f_1$ of the first lens group G1 takes a negative value and the focal length $f_2$ of the second lens group G2 takes a positive value, the term in parentheses must take a negative value so that the distance between the principal points at the wide angle end be dp(W) takes a positive value. Accordingly, the following condition is absolutely required:

$$1/f > 1/f_2$$

In addition, the overall focal length f must be always between the overall focal length at the wide angle end and the telephoto end, in other words, the following condition is absolutely required:

$$f_W \leq f \leq f_T$$

In order for the zoom lens system to meet these absolute requirements, it must satisfy the following condition:

$$1/f_W > 1/f_1 + 1/f_2$$

This condition is transformed by use of equation (6) as follows:

$$f_2 > f_W \cdot \beta^{1/2}/(1+\beta^{1/2}) \quad (12)$$

The condition (I) is derived from the conditions (11) and (12).

The condition (II) yields the compactness and desired optical performance of the zoom lens system. If the upper limit is exceeded, the zoom lens system is rendered difficult to be compact. On the other hand, if the lower limit is exceeded, the zoom lens system is difficult to have the distance between the principal points of the first and second lens groups G1 and G2 which governs the overall length as sufficiently short as it is easy of zooming and, together, loses the distribution of power necessary for stability of image forming performance.

The first and second lens group G2 may have aspherical surfaces which suitably balancing the aberrations of the zoom lens system, such as spherical aberration, field curvature and distortion.

BRIEF DESCRIPTION OF THE DRAWINGS

The above and other objects and features of the present invention will be clearly understood from the following description with respect to preferred embodiments thereof when considered in conjunction with the accompanying drawings, wherein same numerals have been used to denote the same or similar elements throughout the drawings, and in which.

DETAILED DESCRIPTION OF THE PREFERRED EMBODIMENTS

In the following prescription tables where various versions of the invention are set forth, the reference L followed by an arabic numeral indicates the lens element progressively from the object end to the image end of the zoom lens system. The reference S followed by an arabic numeral indicates the lens surface progressively from the object end to the image end of the zoom lens system. The reference radius numbers R are the progressive lens surface radii. The reference axial distance numbers d are the progressive axial distance between adjacent surfaces. N is the index of refraction of the lens element. $\upsilon$ is the Abbe number indicating the dispersion of the lens element. The references $f_1$ and $f_2$ are the focal length of the first and second lens elements L1 and L2, respectively. FL is the overall length of the zoom lens system. The references $f_W$, $f_T$ and f are the overall focal length of the zoom lens system at the wide angle end (EDW), the tele-photo end (EDT) and a middle position (PM) between the wide angle end (EDW) and the telephoto end (EDT), respectively. BF is the back focal length of the zoom lens system. $F_{NO}$ and $2\omega$ are the lens speed or F number and the angle of view, respectively.

The zoom lens system embodying the present invention preferably has aspheric surfaces, on either one or both sides, as will be made apparent from the examples in the following tables. The aspheric surface may be defined by the following equation:

$$X = Cy^2/(1 + \sqrt{1-(1+K)C^2y^2}) + a_1y^4 + a_2y^6 + a_3y^8 + a_4y^{10}$$

where

X is the surface sag at a semi-aperture distance y from the optical axis OX of the zoom lens system;

C is the curvature of a lens surface at the optical axis OX equal to the reciprocal of the radius at the optical axis;

K is a conic constant;

$a_1$–$a_4$ are aspheric coefficients.

Figure 2:
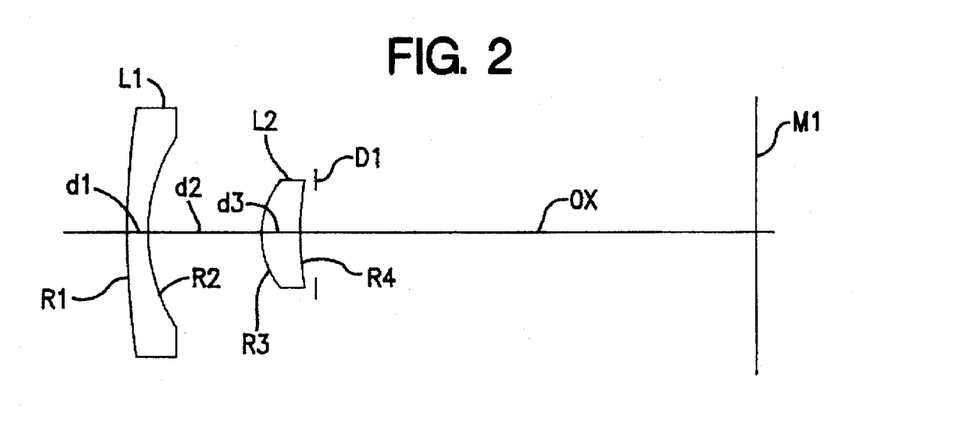
FIG. 2 is a diagrammatic side view of a zoom lens system according to a preferred embodiment of the present invention.
Figure 4:
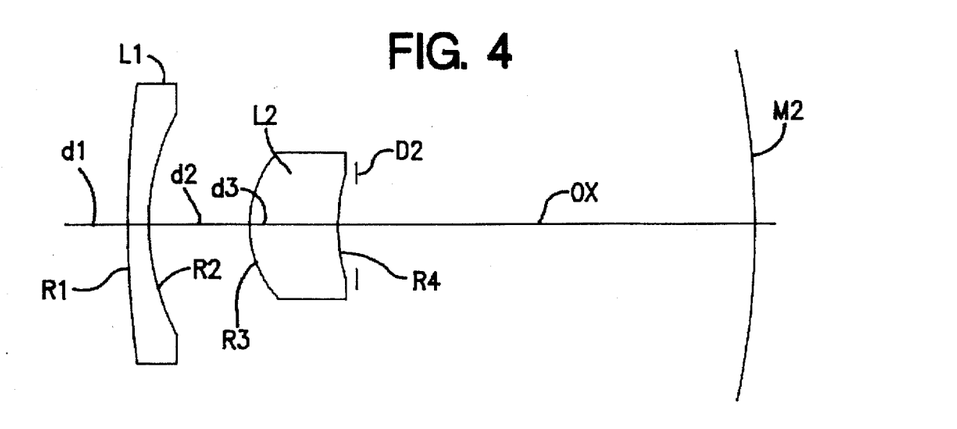
FIG. 4 is a diagrammatic side view of a zoom lens system according to another preferred embodiment of the present invention.
Figure 6:
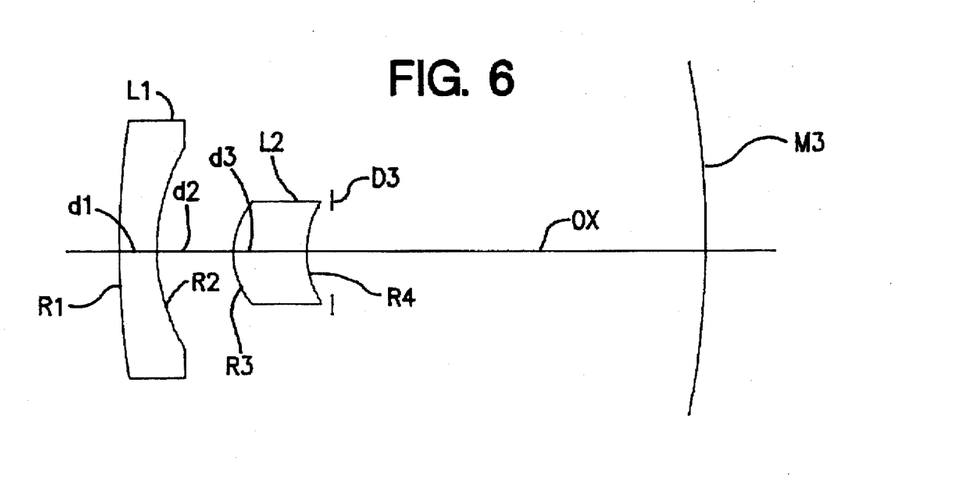
FIG. 6 is a diagrammatic side view of a zoom lens system according to still another preferred embodiment of the present invention.

FIGS. 2, 4 and 6 show various embodiment of the present invention in which the zoom lens system is changeable in focal length between two fixed focal length for wide angle photography and tele photography.

In the first embodiment shown in FIG. 2, the zoom lens system comprises first and second lens groups G1 and G2 arranged in order from the object side. The first lens group G1 consists of a singlet element, such as a negative power meniscus element L1 having a convex object side spherical surface S1 and a concave image side surface S2 which is concave relative to an approximately flat image plane M1. The second lens group G2 consists of a singlet element, such as a positive power meniscus element L2 having a convex object side aspheric surface S3 and a concave image side aspheric surface S4. The zoom lens system further has a diaphragm or lens stop D1 positioned at a certain distance of behind the image end surface S4 of the second lens element L2. The first lens element L1 is stationary with respect to the zoom lens system. The second lens element L2 and fixed lens stop D1 are adapted to be shifted along the optical axis OX as a group during zooming, but in fixed relation to each other during zooming. The lens stop D1 is located at a distance of approximately 0.7 mm behind the image end surface of the second lens element L2.

The zoom lens system as shown in FIG. 2 scaled to an image frame of a 35 mm type of roll film is substantially described in

TABLE I

| Element | Radius of Curvature (mm) | Axial Distance Between Surfaces (mm) | N | $\upsilon$ |
|---|---|---|---|---|
| L1 S1 | $R_1 = 36.870$ | $d_1 = 1.5$ | 1.53840 | 40.30 |
| L1 S2 | $R_2 = 11.120$ | $d_2 = $ variable | | |
| L2 S3 | $R_3 = 3.857$ | $d_3 = 1.989$ | 1.49116 | 57.60 |
| L2 S4 | $R_4 = 6.329$ | | | |

Aspheric Surface: S2, S3 and S3
Aspheric Parameters:

| | S2 | S3 | S4 |
|---|---|---|---|
| C | 0.08993 | 0.25927 | 0.15800 |
| K | 0.38532 | 0.61779 | 0.948097 |
| $a_1$ | $0.18159 \times 10^{-3}$ | $0.21049 \times 10^{-4}$ | $0.39092 \times 10^{-2}$ |
| $a_2$ | $-0.16433 \times 10^{-5}$ | $0.59517 \times 10^{-4}$ | $0.52926 \times 10^{-3}$ |
| $a_3$ | 0 | $-0.39998 \times 10^{-5}$ | $0.10751 \times 10^{-3}$ |
| $a_4$ | 0 | $0.85211 \times 10^{-6}$ | $0.14736 \times 10^{-5}$ |

Zooming Parameters:

| | EDW | MP | EDT |
|---|---|---|---|
| Focal Length: f(mm) | 25.99 | 30.17 | 35.02 |
| Back Focal Length: BF(mm) | 26.87 | 29.07 | 31.62 |
| F number: $F_{NO}$ | 9.60 | 10.4 | 11.30 |
| Angle of View: $2\omega$ | 79.5° | 71.5° | 63.4° |
| Axial Distance: $d_2$(mm) | 6.241 | 3.683 | 1.482 |

TABLE I-continued

| | | | |
|---|---|---|---|
| Overall Length: FL(mm) | 36.60 | 36.24 | 36.60 |

The zoom lens system depicted in FIG. 2 and described in Table I has the following parameters described as follows:

| $f_1$ (mm) | $f_2$ (mm) | $f_W$ | $f_1/f_2$ | $\beta = f_T/f_W$ | LD | $d_W/f_W$ |
|---|---|---|---|---|---|---|
| −30.19 | 15.89 | 25.99 | −1.9 | 1.3474 | 43.267 | 0.317 |

| | |
|---|---|
| $f_W \cdot \beta^{1/2}/(1 + \beta^{1/2})$: | 13.96 |
| $(2 \cdot F_{NO} \cdot LD/1500) \cdot \beta^{1/2}/(1 - \beta^{1/2})^2$: | 24.870 |

As apparent from the above, the zoom lens system shown in FIG. 2 satisfies the conditions (I) and (II).

Figure 3A:
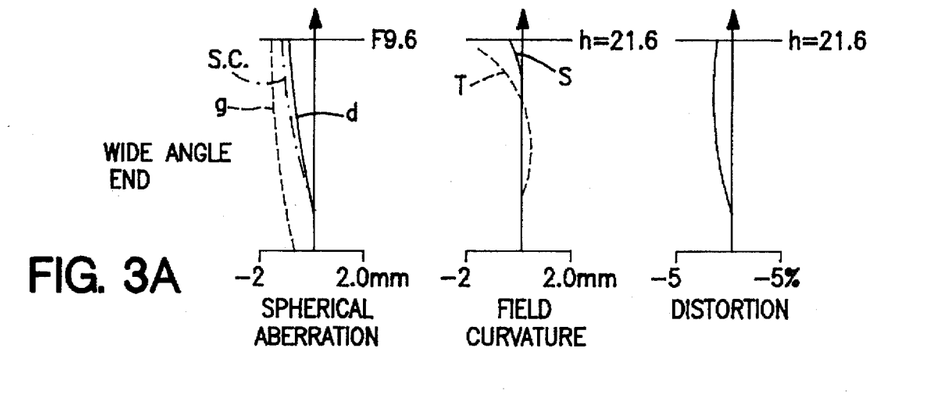
FIG. 3A–3C show diagrams of aberrations of the zoom lens system of FIG. 2.
Figure 3B:
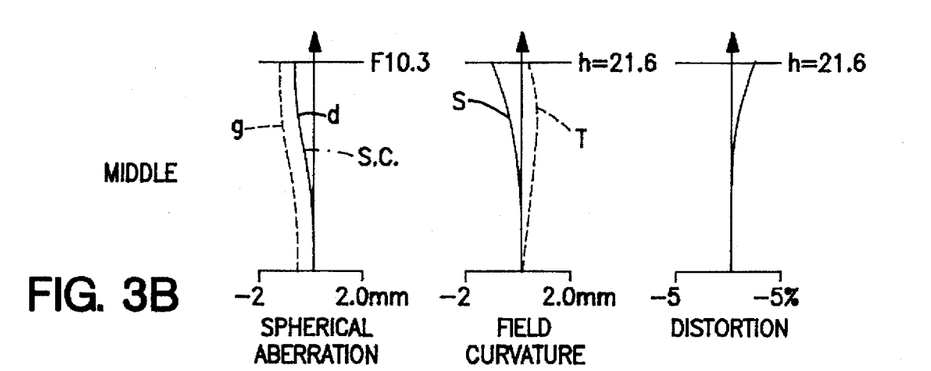
Figure 3C:
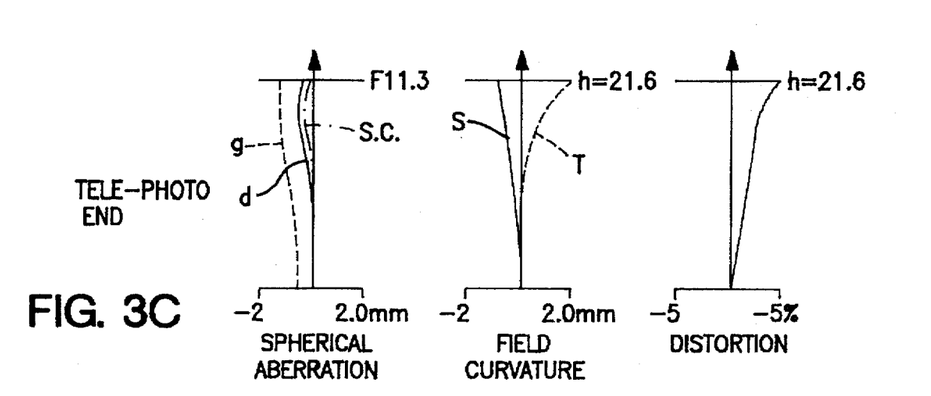

FIG. 3 shows diagrams illustrating aberrations, including spherical aberration, field curvature and distortion of the zoom lens system shown in FIG. 2 at the wide angle end (EDW), the middle point and the tele-photo end (EDT). As apparent in FIG. 3, the zoom lens system has superior correction for these aberrations.

Referring to FIG. 4 which shows another embodiment of the present invention, a zoom lens system comprises a first negative power meniscus element L1 having a concave surface S2 relative to an image surface M2 curved with a curvature of radius of 100 mm and a second positive power meniscus element L2 having a convex object end surface S3. Both surfaces S3 and S4 of the second lens element L2 are aspheric. The zoom lens system further has a lens stop D2 positioned at a distance of approximately 0.7 mm behind the image end surface S4 of the second lens element L2. The first lens element L1 is stationary with respect to the zoom lens system. The second lens element L2 and fixed lens stop D2 are adapted to be shifted along the optical axis OX as a group during zooming, but in fixed relation to each other during zooming.

The zoom lens system as shown in FIG. 4 scaled to an image frame of a 35 mm type of roll film is substantially described in Table II.

TABLE II

| | Radius of Element Curvature (mm) | Axial Distance Between Surfaces (mm) | N | ν |
|---|---|---|---|---|
| L1 | S1 $R_1 = 67.364$ | | | |
| | | $d_1 = 1.5$ | 1.5384 | 40.3 |
| | S2 $R_2 = 12.984$ | | | |
| | | $d_2 =$ variable | | |
| L2 | S3 $R_3 = 3.821$ | | | |
| | | $d_3 = 6.007$ | 1.49116 | 57.6 |
| | S4 $R_4 = 15.401$ | | | |

Aspheric Surface: S3 and S3
Aspheric Parameters:

| | S3 | S4 |
|---|---|---|
| C | 0.17179 | 0.06493 |
| K | −0.20275 | −30.2003 |
| $a_1$ | −0.31115 × 10⁻³ | 0.41239 × 10⁻³ |
| $a_2$ | 0.55017 × 10⁻⁴ | 0.70861 × 10⁻³ |
| $a_3$ | −0.35607 × 10⁻⁵ | −0.10263 × 10⁻³ |
| $a_4$ | 0.91256 × 10⁻⁷ | −0.10628 × 10⁻⁴ |

Zooming Parameters:

| | EDW | MP | EDT |
|---|---|---|---|
| Focal Length: f(mm) | 26.00 | 30.17 | 35.01 |
| Back Focal Length: BF(mm) | 24.04 | 26.22 | 28.75 |
| F number: $F_{NO}$ | 9.60 | 10.4 | 11.30 |

TABLE II-continued

| | | | |
|---|---|---|---|
| Angle of View: 2ω | 79.5° | 71.3° | 63.4° |
| Axial Distance: $d_2$(mm) | 6.211 | 3.679 | 1.50 |
| Overall Length: FL(mm) | 37.76 | 37.406 | 37.76 |

The zoom lens system depicted in FIG. 4 and described in Table II has the following parameters described as follows:

| $f_1$ (mm) | $f_2$ (mm) | $f_W$ | $f_1/f_2$ | $\beta = f_T/f_W$ | LD | $d_W/f_W$ |
|---|---|---|---|---|---|---|
| −30.19 | 15.79 | 26.0 | −1.9 | 1.3465 | 43.267 | 0.47 |

| | |
|---|---|
| $f_W \cdot \beta^{1/2}/(1 + \beta^{1/2})$: | 13.965 |
| $(2 \cdot F_{NO} \cdot LD/1500) \cdot \beta^{1/2}/(1 - \beta^{1/2})^2$: | 24.982 |

As apparent from the above, the zoom lens system shown in FIG. 4 satisfies the conditions (I) and (II).

Figure 5A:
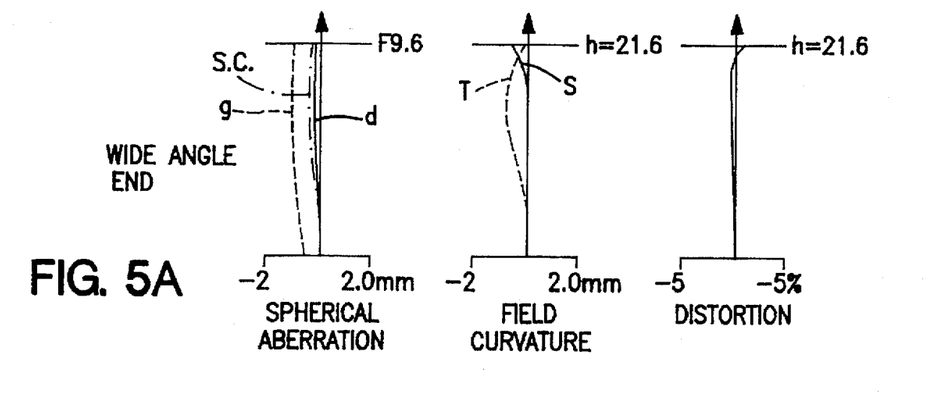
FIG. 5A–5C show diagrams of aberrations of the zoom lens system of FIG. 4.
Figure 5B:
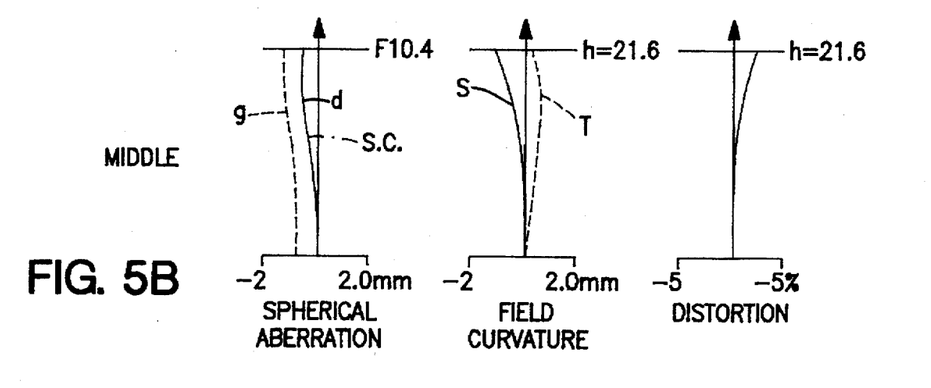
Figure 5C:
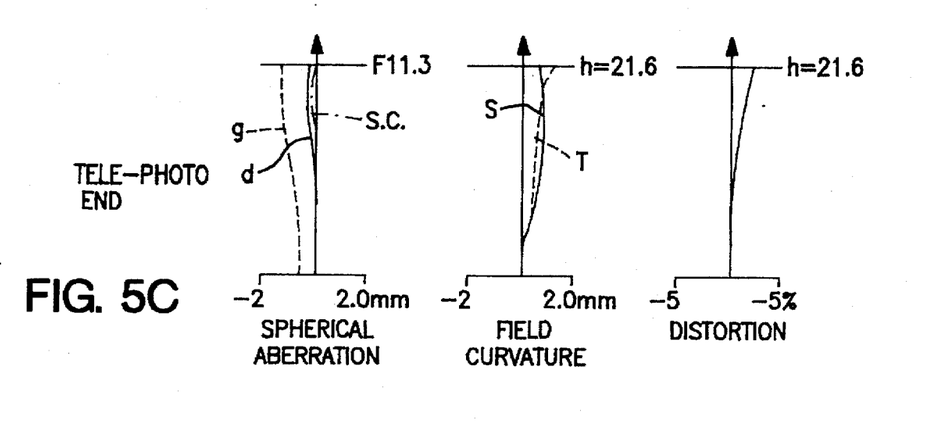

FIGS. 5A–5C show diagrams illustrating aberrations, including spherical aberration, field curvature and distortion of the zoom lens system shown in FIG. 4 at the wide angle end (EDW), the middle point (PM) and the tele-photo end (EDT). As apparent in FIGS. 5A–5C, the zoom lens system has superior correction for these aberrations.

FIG. 6 shows a further embodiment of the present invention. A zoom lens system comprises a first negative power meniscus element L1 having a concave surface S2 relative to an image surface M3 curved with a curvature of radius of approximately −100 mm. and a second positive power meniscus element L2 having a convex object end surface S3. Both surfaces S3 and S4 of the second lens element L2 are aspheric. A lens stop D3 is positioned at a distance of approximately 0.7 mm. behind the image end surface S4 of the second lens element L2. The first lens element L1 is stationary with respect to the zoom lens system. The second lens element L2 and fixed lens stop D are adapted to be shifted along the optical axis OX as a group during zooming, but in fixed relation to each other during zooming.

The zoom lens system as shown in FIG. 6 scaled to an image frame of 35 mm type of roll film is substantially described in Table III.

TABLE III

| | Radius of Element Curvature (mm) | Axial Distance Between Surfaces (mm) | N | ν |
|---|---|---|---|---|
| L1 | S1 $R_1 = 43.264$ | | | |
| | | $d_1 = 1.5$ | 1.5384 | 40.3 |
| | S2 $R_2 = 10.931$ | | | |
| | | $d_2 =$ variable | | |
| L2 | S3 $R_3 = 5.121$ | | | |
| | | $d_3 = 5.049$ | 1.49116 | 57.6 |
| | S4 $R_4 = 12.494$ | | | |

Aspheric Surface: S3 and S3
Aspheric Parameters:

| | S3 | S4 |
|---|---|---|
| C | 0.19527 | 0.08004 |
| K | −0.32359 | −24.9631 |
| $a_1$ | −0.26079 × 10⁻³ | 0.18703 × 10⁻² |
| $a_2$ | 0.95112 × 10⁻⁴ | 0.15829 × 10⁻³ |
| $a_3$ | −0.70614 × 10⁻⁵ | −0.15891 × 10⁻⁴ |
| $a_4$ | 0.23781 × 10⁻⁶ | 0.37146 × 10⁻⁵ |

Zooming Parameters:

| | EDW | MP | EDT |
|---|---|---|---|
| Focal Length: f(mm) | 24.00 | 37.62 | 32.0 |

TABLE III-continued

| Back Focal Length: BF(mm) | 22.27 | 24.16 | 26.44 |
|---|---|---|---|
| F number: $F_{NO}$ | 9.60 | 11.08 | 11.04 |
| Angle of View: $2\omega$ | 84.1° | 76.1° | 68.1° |
| Axial Distance: $d_2$(mm) | 5.648 | 3.473 | 1.50 |
| Overall Length: FL(mm) | 34.464 | 34.182 | 34.493 |

The zoom lens system depicted in FIG. 6 and described in Table III has the following parameters described as follows:

| $f_1$ (mm) | $f_2$ (mm) | $f_w$ | $f_1/f_2$ | $\beta = f_T/f_W$ | LD | $d_W/f_W$ |
|---|---|---|---|---|---|---|
| −27.62 | 14.42 | 24.0 | −1.915 | 1.3333 | 43.267 | 0.446 |

| | |
|---|---|
| $f_W \cdot \beta^{1/2}/(1 + \beta^{1/2})$: | 12.86 |
| $(2 \cdot F_{NO} \cdot LD/1500) \cdot \beta^{1/2}/(1 - \beta^{1/2})^2$: | 26.726 |

As apparent from the above, the zoom lens system shown in FIG. 6 satisfies the conditions (I) and (II).

Figure 7A:
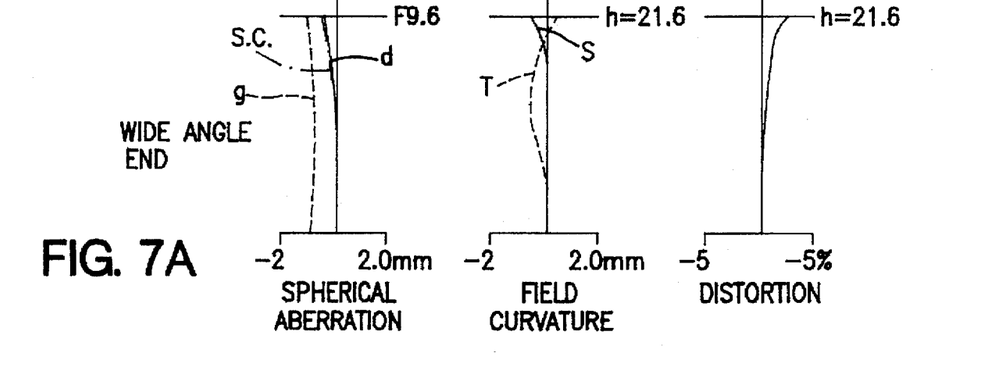
FIGS. 7A–7C shows diagrams of aberrations of the zoom lens system of FIG. 6.
Figure 7B:
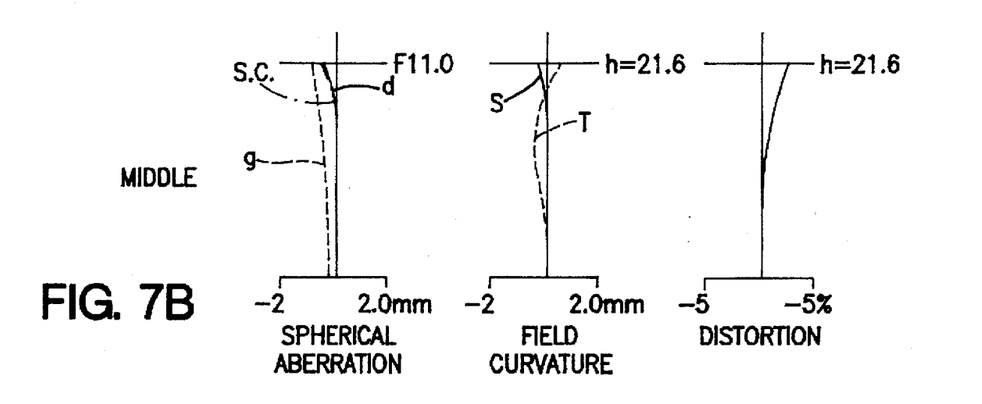
Figure 7C:
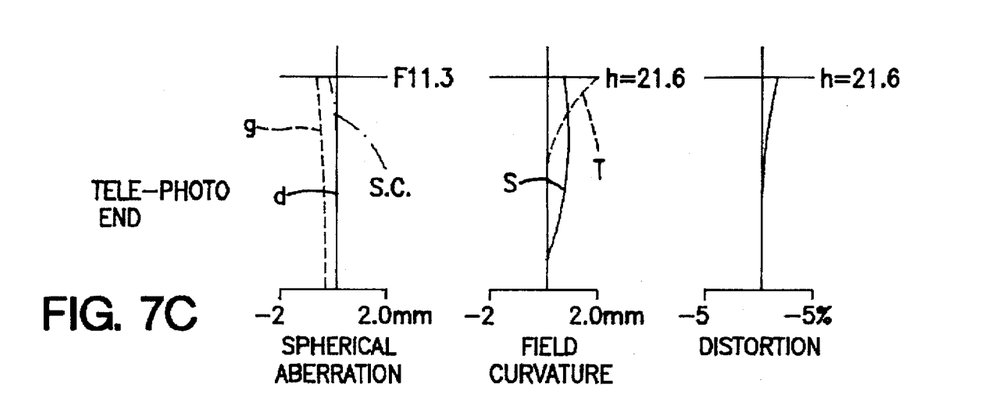

FIGS. 7A-7C shows diagrams illustrating aberrations, including spherical aberration, field curvature and distortion of the zoom lens system shown in FIG. 6 at the wide angle end (EDW), the middle point and the tele-photo end (EDT). It is apparent in FIG. 7A-7C, the zoom lens system has superior correction for these aberrations.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A zoom lens system comprising in order from the object end to the image end a first negative power lens group which is stationary with respect to said zoom lens system and a second positive power lens group which is movable along an optical axis of the zoom lens system, said second positive power lens group being changed between two specific axial positions so as to yield a short focal length suitable for wide angle photography and a long focal length suitable for a tele-photography, respectively, the zoom lens system satisfying the following condition:

$$f_W \cdot \beta^{1/2}/(1+\beta^{1/2}) < f_2 \leq (2 \cdot F_{NO} \cdot LD/1500) \cdot \beta^{1/2}/(1\beta^{1/2})^2$$

where $f_w$ is the overall focal length of the zoom lens system at the wide angle end, $\beta$ is the zoom ratio of the zoom lens system which is expressed by a ratio of the overall focal length between the tele-photo end and the wide angle end, $f_2$ is the focal length of the second lens group, $F_{NO}$ is the F number of the zoom lens system at the wide angle end, and LD is the diagonal length of the image area.

2. A zoom lens system as defined in claim 1, wherein each of the first negative power lens group and the second positive power lens group consists of a meniscus singlet element.

3. A zoom lens system as defined in claim 1, further comprising a lens stop disposed behind an image end surface of the second positive power lens group.

4. A zoom lens system as defined in claim 1, and further satisfying the following condition:

$$0.2 < d_W/f_W < 0.6$$

where $d_W$ is the axial distance between the image end surfaces of the first and second lens groups at the wide angle end.

5. A zoom lens system as defined in claim 4, wherein said second positive power lens group is a meniscus singlet element having an object end aspheric surface and an image end aspheric surface, each aspheric surface being defined by the following relationship:

$$X = Cy^2/(1+\sqrt{1-(1+K)C^2y^2}) + a_1y^4 + a_2y^6 + a_3y^8 + a_4y^{10}$$

where X is the surface sag at a semi-aperture distance y from the optical axis OX of the zoom lens system, C is the curvature of a lens surface at the optical axis OX equal to the reciprocal of the radius at the optical axis, K is a conic constant, and $a_1$–$a_4$ are aspheric coefficients.

6. A zoom lens system as defined in claim 5 having a focal length of 26.0 mm to 35.01 mm substantially as follows:

| Element | Radius of Curvature (mm) | | Axial Distance Between Surfaces (mm) | N | $\nu$ |
|---|---|---|---|---|---|
| L1 | S1 | $R_1 = 67.364$ | $d_1 = 1.5$ | 1.5384 | 40.3 |
| | S2 | $R_2 = 12.984$ | $d_2$ = variable | | |
| L2 | S3 | $R_3 = 3.821$ | $d_3 = 6.007$ | 1.49116 | 57.6 |
| | S4 | $R_4 = 15.401$ | | | |

Aspheric Surface: S3 and [S3] S4
Aspheric Parameters:

| | S3 | S4 |
|---|---|---|
| C | 0.17179 | 0.06493 |
| K | −0.20275 | −30.2003 |
| $a_1$ | $-0.31115 \times 10^3$ | $0.41239 \times 10^{-3}$ |
| $a_2$ | $0.55017 \times 10^{-4}$ | $0.70861 \times 10^{-3}$ |
| $a_3$ | $-0.35607 \times 10^{-5}$ | $-0.10263 \times 10^{-3}$ |
| $a_4$ | $0.91256 \times 10^{-7}$ | $-0.10628 \times 10^{-4}$ |

Zooming Parameters:

| | Wide Angle End | Middle Point | Tele-Photo End |
|---|---|---|---|
| f(mm) | 26.00 | 30.17 | 35.01 |
| $d_2$(mm) | 6.211 | 3.679 | 1.50 | where the zoom lens system comprises singlet lens elements L1 and L2 having surfaces S1 to S4 and surface radii R1 to R4, $d_1$ to $d_3$ are the axial distances, the index of refraction is given by N, the dispersion is defined by the Abbe number as given by $\upsilon$, and f is the overall focal length of the zoom lens system.

7. A zoom lens system as defined in claim 5 having a focal length of 24.0 mm to 32.0 mm substantially as follows:

| Element | Radius of Curvature (mm) | | Axial Distance Between Surfaces (mm) | N | $\nu$ |
|---|---|---|---|---|---|
| L1 | S1 | $R_1 = 43.264$ | $d_1 = 1.5$ | 1.5384 | 40.3 |
| | S2 | $R_2 = 10.931$ | $d_2$ = variable | | |
| L2 | S3 | $R_3 = 5.121$ | $d_3 = 5.049$ | 1.49116 | 57.6 |
| | S4 | $R_4 = 12.494$ | | | |

Aspheric Surface: S3 and [S3] S4
Aspheric Parameters:

| | S3 | S4 |
|---|---|---|
| C | 0.19527 | 0.08004 |

-continued

| | | |
|---|---|---|
| K | −0.32359 | −24.9631 |
| $a_1$ | −0.26079 × 10⁻³ | 0.18703 × 10⁻² |
| $a_2$ | 0.95112 × 10⁻⁴ | 0.15829 × 10⁻³ |
| $a_3$ | −0.70614 × 10⁻⁵ | −0.15891 × 10⁻⁴ |
| $a_4$ | 0.23781 × 10⁻⁶ | −0.37146 × 10⁻⁵ |

Zooming Parameters:

| | Wide Angle End | Middle Point | Tele-Photo End |
|---|---|---|---|
| f(mm) | 24.00 | 37.62 | 32.0 |
| $d_2$(mm) | 5.648 | 3.473 | 1.50 | where the zoom lens system comprises singlet lens elements L1 and L2 having surfaces S1 to S4 and surface radii R1 to R4, $d_1$ to $d_3$ are the axial distances, the index of refraction is given by N, the dispersion is defined by the Abbe number as given by $\upsilon$, and f is the overall focal length of the zoom lens system.

8. A zoom lens system as defined in claim 5, wherein said first meniscus singlet element has an image end aspheric surface, said aspheric surface being defined by the following relationship:

$$X = Cy^2/(1 + \sqrt{1-(1+K)C^2y^2}\,) + a_1y^4 + a_2y^6 + a_3y^8 + a_4y^{10}$$

where X is the surface sag at a semi-aperture distance y from the optical axis OX of the zoom lens system, C is the curvature of a lens surface at the optical axis OX equal to the reciprocal of the radius at the optical axis, K is a conic constant, and $a_1$–$a_4$ are aspheric coefficients.

9. A zoom lens system as defined in claim 8 having a focal length of 25.99 mm to 35.02 mm substantially as follows:

| Element | Radius of Curvature (mm) | Axial Distance Between Surfaces (mm) | N | $\upsilon$ |
|---|---|---|---|---|
| L1 | S1 $R_1$ = 36.870 | $d_1$ = 1.5 | 1.53840 | 40.30 |
| | S2 $R_2$ = 11.120 | $d_2$ = variable | | |
| L2 | S3 $R_3$ = 3.857 | $d_3$ = 1.989 | 1.49116 | 57.60 |
| | S4 $R_4$ = 6.329 | | | |

Aspheric Surface: S2, S3 and [S3] S4
Aspheric Parameters:

| | S2 | S3 | S4 |
|---|---|---|---|
| C | 0.08993 | 0.25927 | 0.15800 |
| K | 0.38532 | 0.61779 | 0.948097 |
| $a_1$ | 0.18159 × 10⁻³ | 0.21049 × 10⁻⁴ | 0.39092 × 10⁻² |
| $a_2$ | −0.16433 × 10⁻⁵ | 0.59517 × 10⁻⁴ | 0.52926 × 10⁻³ |
| $a_3$ | 0. | −0.39998 × 10⁻⁵ | 0.10751 × 10⁻³ |
| $a_4$ | 0. | −0.85211 × 10⁻⁶ | 0.14736 × 10⁻⁵ |

Zooming Parameters:

| | Wide Angle End | Middle Point | Tele-Photo End |
|---|---|---|---|
| f(mm) | 25.99 | 30.17 | 35.02 |
| $d_2$(mm) | 6.241 | 3.683 | 1.482 | where the zoom lens system comprises singlet lens elements L1 and L2 having surfaces S1 to S4 and surface radii R1 to R4, $d_1$ to $d_3$ are the axial distances, the index of refraction is given by N, the dispersion is defined by the Abbe number as given by $\upsilon$, and f is the overall focal length of the zoom lens system.

\* \* \* \* \*

UNITED STATES PATENT AND TRADEMARK OFFICE
CERTIFICATE OF CORRECTION

PATENT NO. : 5,745,303
DATED : April 28, 1998
INVENTOR(S) : Kazunori OHNO

It is certified that error appears in the above-indentified patent and that said Letters Patent is hereby corrected as shown below:

On the title page, add the foreign priority data, Item [30], as follows:

--June 14, 1994    [JP]    Japan..........6-131829--.

Signed and Sealed this

Twenty-third Day of June, 1998

Attest:

BRUCE LEHMAN

*Attesting Officer*       *Commissioner of Patents and Trademarks*